(12) United States Patent
Okitsu

(10) Patent No.: US 7,694,939 B2
(45) Date of Patent: Apr. 13, 2010

(54) FLOW RATE CONTROL VALVE

(75) Inventor: Atsushi Okitsu, Yokohama (JP)

(73) Assignee: SMC Kabushiki Kaisha, Tokyo (JP)

( * ) Notice: Subject to any disclaimer, the term of this patent is extended or adjusted under 35 U.S.C. 154(b) by 794 days.

(21) Appl. No.: 11/467,412

(22) Filed: Aug. 25, 2006

(65) Prior Publication Data

US 2007/0045580 A1 Mar. 1, 2007

(30) Foreign Application Priority Data

Sep. 1, 2005 (JP) .............................. 2005-253632

(51) Int. Cl.
F16K 31/50 (2006.01)
(52) U.S. Cl. .................. 251/264; 251/129.12; 251/229; 251/248; 251/335.3; 251/285; 251/282
(58) Field of Classification Search .................. 251/60, 251/92, 215, 264, 270, 271, 284, 285, 330, 251/331, 335.2, 335.3, 129.12, 229, 250.5, 251/334; 137/312
See application file for complete search history.

(56) References Cited

U.S. PATENT DOCUMENTS

| | | | | |
|---|---|---|---|---|
| 2,995,337 | A * | 8/1961 | Tanner | 251/282 |
| 3,428,291 | A * | 2/1969 | Callahan, Jr. et al. | 251/122 |
| 4,074,688 | A * | 2/1978 | Snyder | 137/269 |
| 4,274,444 | A * | 6/1981 | Ruyak | 137/630.14 |
| 4,364,541 | A * | 12/1982 | Chabat-Courrede et al. | 251/54 |
| 5,178,304 | A * | 1/1993 | Torterotot | 222/333 |
| 5,851,003 | A * | 12/1998 | Aoki et al. | 251/288 |
| 6,076,551 | A | 6/2000 | Miyazoe | |
| 6,220,571 | B1 * | 4/2001 | Kim et al. | 251/284 |
| 6,296,013 | B1 | 10/2001 | Hosono et al. | |
| 6,321,772 | B1 | 11/2001 | Uehara et al. | |
| 6,499,907 | B1 * | 12/2002 | Baur | 403/188 |
| 6,738,996 | B1 * | 5/2004 | Malek et al. | 4/677 |
| 6,749,173 | B2 * | 6/2004 | Heiling | 251/30.03 |

FOREIGN PATENT DOCUMENTS

CN 1519479 8/2004

(Continued)

OTHER PUBLICATIONS

DE3502588 Translation, EPO automated translation of DE 3502588.*

*Primary Examiner*—Stephen Hepperle
*Assistant Examiner*—Jeremy S Baskin
(74) *Attorney, Agent, or Firm*—Paul A. Guss

(57) ABSTRACT

A retaining cylinder is threadedly engaged with a fixed cylinder of a flow rate control valve, by means of a screw section formed on an outer circumferential surface. A fence cover, which is capable of expanding and contracting in the axial direction, is installed between the fixed cylinder and a float rod supported by the retaining cylinder. An upper seal member is provided on the float rod, on the upper side thereof with respect to a valve plug. A lower seal member is provided on the lower side thereof with respect to the valve plug. The upper seal member and the lower seal member have substantially identical diameters. The float rod is displaced under an energizing action of a stepping motor. The flow rate of a fluid is controlled depending on a distance of the valve plug with respect to a valve seat.

19 Claims, 6 Drawing Sheets

FOREIGN PATENT DOCUMENTS

| | | | |
|---|---|---|---|
| DE | 3502588 A1 * | 8/1986 | |
| GB | 1417343 | 12/1975 | |
| JP | 57-54636 U | 3/1982 | |
| JP | 6-131057 | 5/1994 | |
| JP | 11-173883 A | 7/1999 | |
| JP | 2000-18400 | 1/2000 | |

* cited by examiner

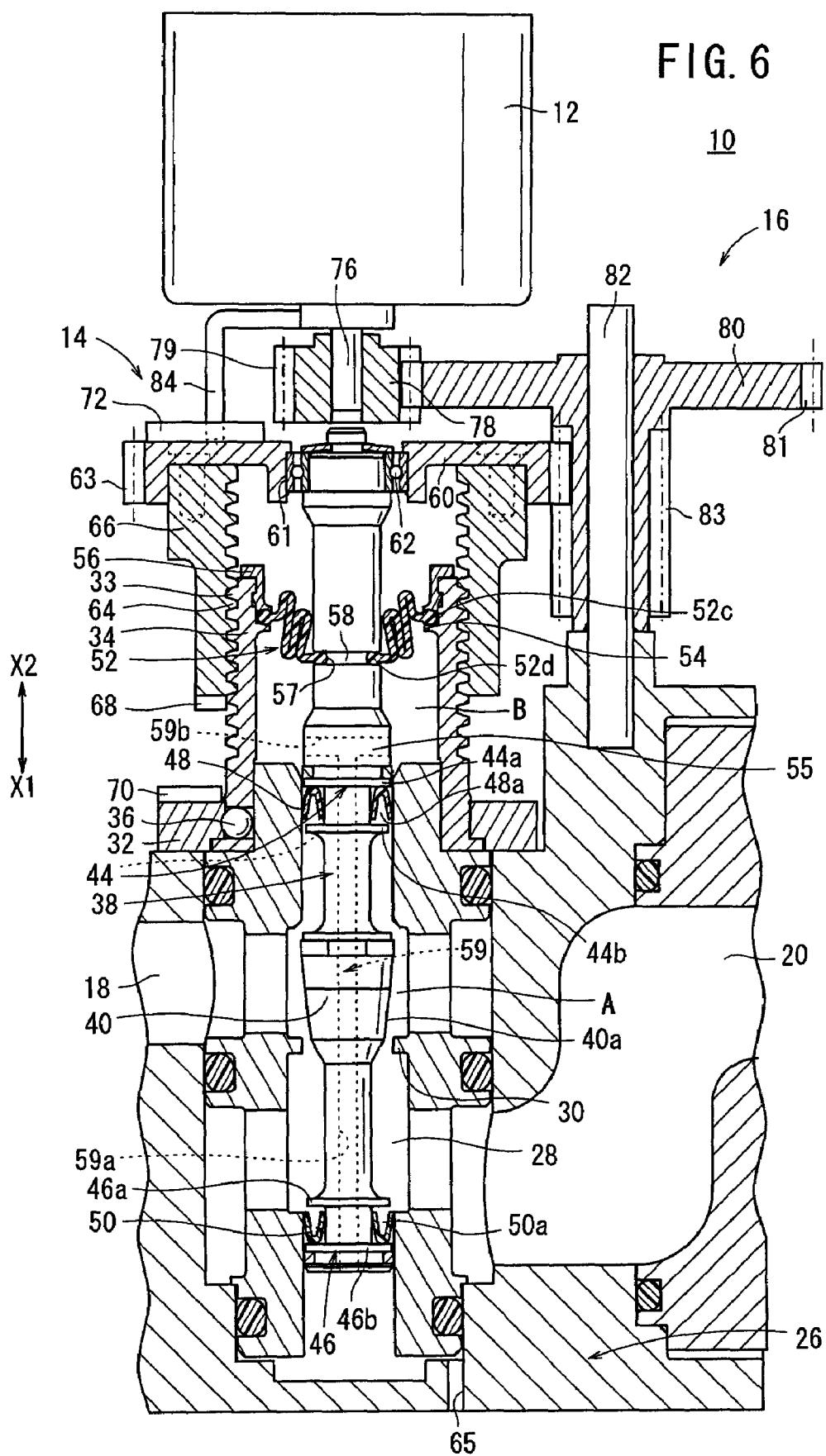

FLOW RATE CONTROL VALVE

BACKGROUND OF THE INVENTION

1. Field of the Invention

The present invention relates to a flow rate control valve, which is capable of controlling the flow rate of a fluid that flows through a flow passage by displacing a valve plug in an axial direction under the driving action of a driving source.

2. Description of the Related Art

The following structure has hitherto been adopted for a flow rate control valve. Specifically, an inner cylinder, having a screw section formed on the inner circumferential surface thereof, is rotatably provided within a valve housing. A valve shaft, having a valve plug fixed at one end thereof and a screw section disposed on its outer circumferential surface, is inserted into the inner cylinder. Screw sections of the inner cylinder and the valve shaft are threadedly engaged with each other.

In this arrangement, the inner cylinder is rotated by means of a stepping motor, while inhibiting rotation of the valve shaft, in a state in which the screw sections of the inner cylinder and the valve shaft are threadedly engaged with each other. The valve shaft is moved in the axial direction, thereby controlling opening and closing of the valve plug, so as to control the flow rate of the fluid. An example of the above-described conventional technique is disclosed, for example, in Japanese Laid-Open Utility Model Publication No. 57-54636.

In the case of the flow rate control valve described above, a lubricant such as grease is applied beforehand to the screw sections of the inner cylinder and the valve shaft, in order to avoid abrasion of the screw sections. However, for example, when pure water flows as the fluid through the valve, since the screw section exists inside the inner cylinder, there is a disadvantage in that such pure water may become polluted by the lubricant.

When the liquid, such as pure water, flows into the valve chamber of the flow rate control valve, high water pressure is exerted in one direction of the valve plug. As a result, the water pressure is applied in one direction of the screw section of the valve shaft, and frictional force is increased between the screw section of the valve shaft and the screw section of the inner cylinder. Consequently, a high rotational torque is required to rotate the inner cylinder, and abrasion is likely to occur at the screw sections of the valve shaft and the inner cylinder. Therefore, the service life of the flow rate control valve may be shortened.

SUMMARY OF THE INVENTION

A general object of the present invention is to provide a flow rate control valve, in which pollution of a fluid that flows through a valve housing is prevented, abrasion of screw sections is avoided, and opening and closing operations of a valve plug can be performed at a low torque, and wherein durability of the flow rate control valve is excellent.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a magnified longitudinal sectional view illustrating main components and depicting a state in which a valve plug of the flow rate control valve shown in FIG. 2 is fully opened.

DESCRIPTION OF THE PREFERRED EMBODIMENTS

Figure 1:
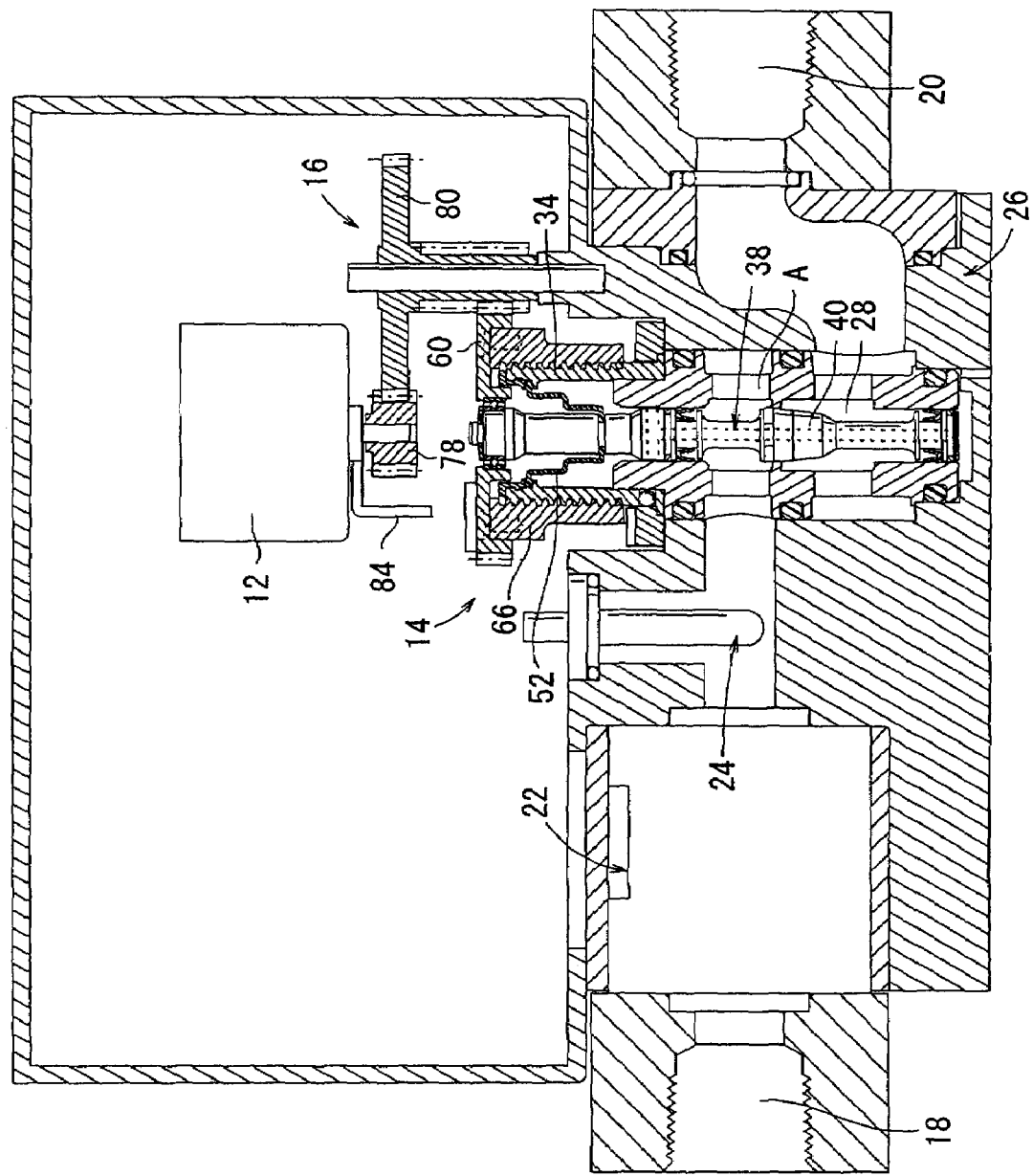
FIG. 1 is a schematic longitudinal sectional view illustrating an overall structure of a flow rate control valve according to an embodiment of the present invention.

A flow rate control valve 10, as shown in FIG. 1, comprises a driving motor such as a stepping motor 12, a main valve body 14 driven by a rotary driving force of the stepping motor 12, and a driving force transmission mechanism 16, which transmits the rotary driving force of the stepping motor 12 to the main valve body 14.

The flow rate control valve 10 further comprises, in the main valve body 14, an inlet port (fluid-introducing port) 18 into which a fluid (for example, pure water) is introduced, an outlet port (fluid-discharging port) 20 from which the fluid, having been subjected to flow rate control by the main valve body 14, is discharged, a flow rate sensor 22 arranged in the inlet port 18 for detecting the flow rate of the fluid that flows thereinto, and a temperature sensor 24 arranged in the inlet port 18 on a downstream side from the flow rate sensor 22, which detects the temperature of the fluid.

Figure 2:
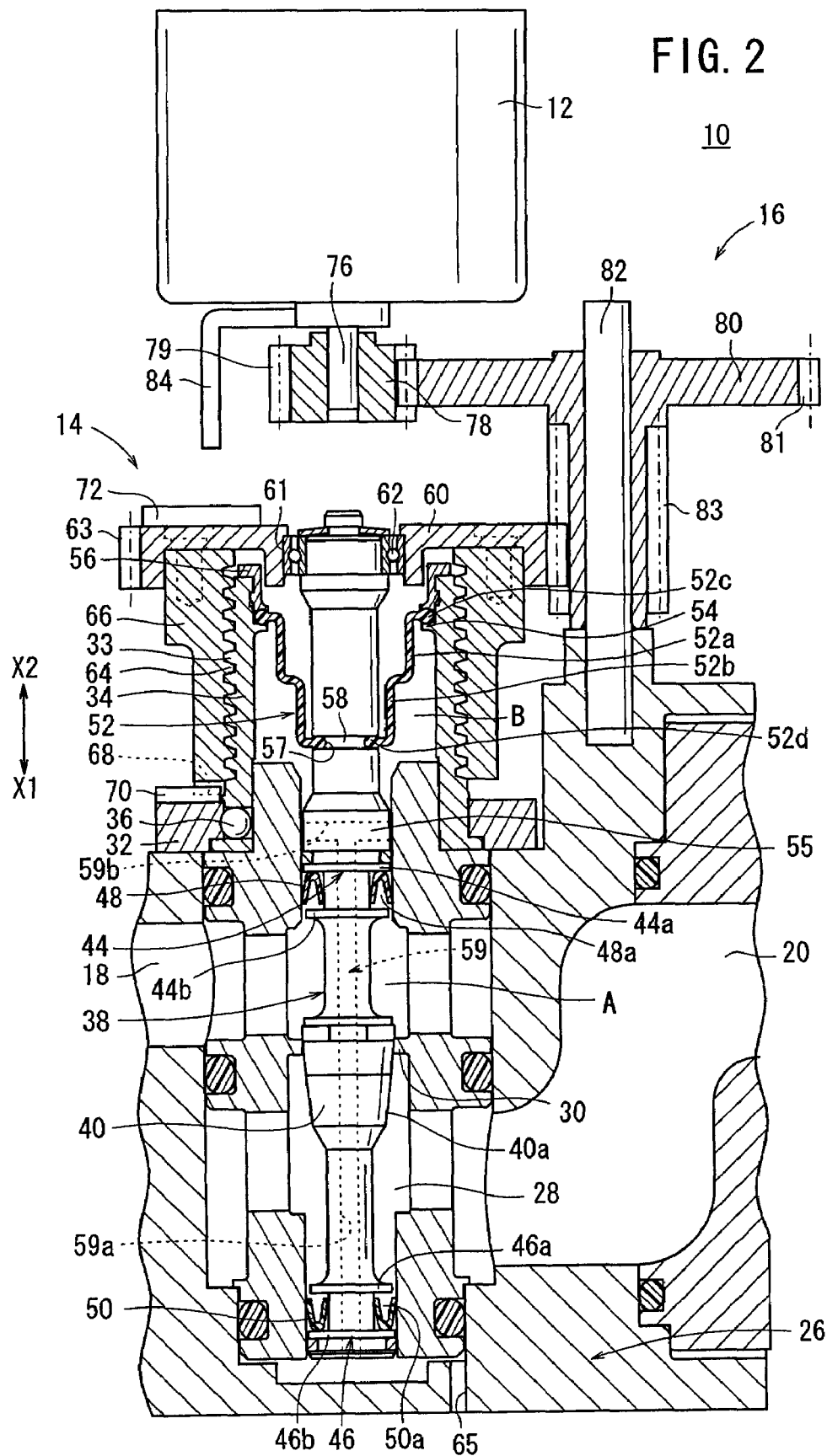
FIG. 2 is a magnified longitudinal sectional view illustrating main components of the flow rate control valve shown in FIG. 1.

As shown in FIG. 2, the main valve body 14 includes a valve housing 26. A valve hole 28 is formed in the valve housing 26, so that the valve hole 28 extends in the vertical direction (directions of the arrows X1, X2). An annular valve seat 30 protrudes from the inner wall of the valve housing 26, which faces the valve hole 28. That is, the valve seat 30 has a comparatively small diameter, which is diametrically reduced in a radially inward direction, with respect to the valve hole 28.

A disk-shaped base seat 32 is fixed to an upper portion of the valve housing 26 coaxially with the valve hole 28. A cylindrical fixed cylinder 34, which has a screw section 33 engraved on its outer circumferential surface, is inserted into the base seat 32. The base seat 32 is disposed in an upstanding orientation, while the base seat 32 is capable of being positioned and rotated by a predetermined angle (for example, 45°) by means of a ratchet mechanism, including a ball 36 retained by the fixed cylinder 34. Details of the above-described fixed cylinder 34 shall be explained in detail later on.

A float rod 38 is inserted so as to be displaceable in the axial direction (directions of the arrows X1, X2), so that the float rod 38 penetrates through the valve hole 28 and the fixed cylinder 34 while being positioned within the valve hole 28 and the fixed cylinder 34. A valve plug 40, which is capable of being seated on the valve seat 30, is provided on the float rod 38. The valve plug 40 is substantially conical, and is provided with a tapered surface 40a having a diameter that is progressively reduced in a downward direction. As the float rod 38 is displaced from an upper position to a lower position, the spacing between the valve plug 40 and the valve seat 30 gradually decreases as a result of the tapered surface 40a, until the tapered surface 40a finally makes tight contact with the inner circumferential surface of the valve seat 30.

The float rod 38 is provided with an upper pressure-receiving section 44, which is disposed upwardly from the valve plug 40 and is separated from the valve plug 40 by a predetermined distance. The float rod also is provided with a lower pressure-receiving section 46, which is disposed downwardly from the valve plug 40 and is separated from the valve plug 40 by a predetermined distance. The upper pressure-receiving section 44 and the lower pressure-receiving section 46 have substantially identical diameters.

An annular upper seal member (first pressure-receiving section) 48 is installed on the upper pressure-receiving section 44, between the valve hole 28 and the float rod 38, so that the upper seal member 48 is disposed between a pair of flanges 44a, 44b. On the other hand, an annular lower seal member (second pressure-receiving section) 50 is installed on the lower pressure-receiving section 46, between the valve hole 28 and the float rod 38, so that the lower seal member 50 is disposed between a pair of flanges 46a, 46b.

The upper and lower seal members 48, 50 have substantially V-shaped cross sections, and are installed such that openings 48a, 50a thereof are disposed on respective sides of the valve plug 40. That is, the upper and lower seal members 48, 50 are arranged such that the opening 48a of the upper seal member 48 and the opening 50a of the lower seal member 50 are opposed to one another. However, the upper and lower seal members 48, 50 need not necessarily be formed with substantially V-shaped cross sections. O-rings may also be used, for example.

In this arrangement, the upper seal member 48 and the lower seal member 50 are composed of an identical rubber material, which is excellent in elasticity. The upper seal member 48 and the lower seal member 50 also have the same shape, wherein the outer circumferential diameter thereof is formed so as to be the same as the inner circumferential diameter of the valve hole 28 in which the upper seal member 48 and the lower seal member 50 are installed. Therefore, the upper seal member 48 and the lower seal member 50 have substantially identical outer circumferential diameters, thus forming identical pressure-receiving areas. The region, which is formed in the valve hole 28 and between the upper and lower seal members 48, 50, shall hereinafter be referred to as the "valve chamber (space) A".

The inlet port 18 and the outlet port 20 communicate with the valve chamber A. When the valve plug 40 is seated on the valve seat 30, communication between the inlet port 18 and the outlet port 20 is blocked. When the valve plug 40 separates away from the valve seat 30, the inlet port 18 and the outlet port 20 are placed in communication with each other.

A cylindrical fence cover (cover member) 52, formed, for example, from a pressure-resistant rubber material, is disposed inside the fixed cylinder 34. The fence cover 52 is attached so as to be expandable and contractible in the axial direction (directions of the arrows X1, X2) with respect to the fixed cylinder 34 and the float rod 38.

Figure 3:
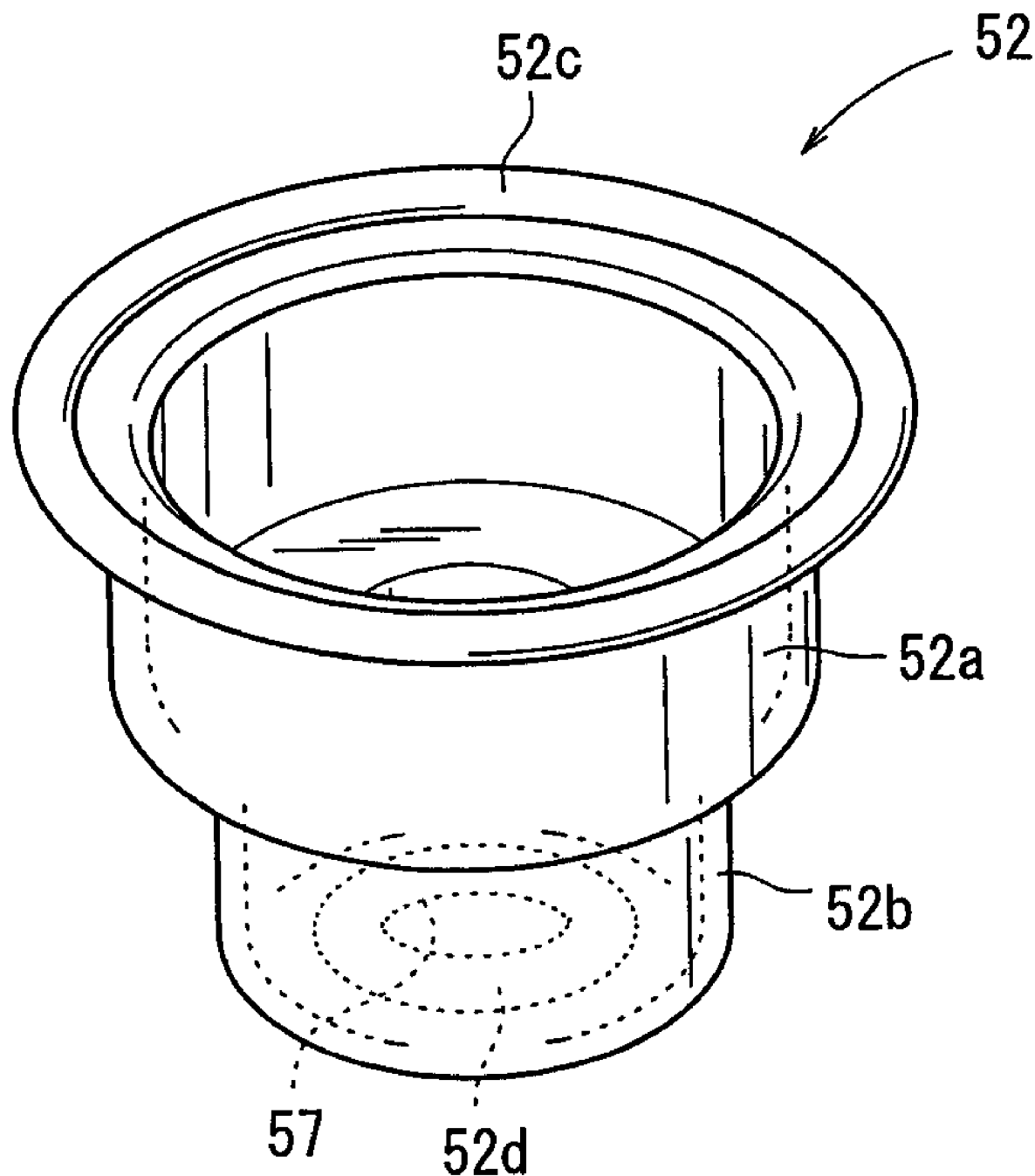
FIG. 3 is a perspective view showing a fence cover used in the flow rate control valve shown in FIG. 2.

As shown in FIG. 3, the fence cover 52 includes a large diameter cylindrical section 52a, and a small diameter cylindrical section 52b, which is reduced in diameter compared to the large diameter cylindrical section 52a, and which is disposed adjacent to the large diameter cylindrical section 52a. The fence cover 52 has a bent cross sectional shape, in which the large diameter cylindrical section 52a and the small diameter cylindrical section 52b are integrally formed coaxially with each other. A flange section 52c, which is bent in a radially outward direction, is provided at an open end of the large diameter cylindrical section 52a. The open end of the small diameter cylindrical section 52b includes an annular portion 52d, which is bent in a radially inward direction.

The flange section 52c is positioned on an annular projection tab 54 that protrudes in the radially inward direction on the inner wall of the fixed cylinder 34. The flange section 52c is interposed and attached to the fixed cylinder 34 by means of an annular fixing member 56, which is attached to the upper end of the fixed cylinder 34. On the other hand, the annular portion 52d is fitted into a circumferential groove 58 formed on the float rod 38 by means of a hole 57 formed at a substantially central portion thereof.

A water vent hole (passage) 59 is formed in the float rod 38. The water vent hole 59 includes a first passage 59a that extends in the axial direction (directions of the arrows X1, X2) of the float rod 38, and a second passage 59b, which is connected to the end of the first passage 59a and extends in a direction substantially perpendicular to the axis, inside an expanded section 55 formed at a substantially central portion of the float rod 38. More specifically, the first and second passages 59a, 59b communicate mutually within the float rod 38. The first passage 59a penetrates through to the lower end of the float rod 38, and the first passage 59a opens to the outside. Further, the second passage 59b penetrates to the outer circumferential surface of the expanded section 55. A discharge hole 65, through which fluid that flows through the water vent hole 59 is discharged, is formed at the bottom of the valve housing 26.

When the float rod 38 is moved upwardly, the second passage 59b faces the region B, which is formed by the fence cover 52, the upper seal member 48 and the float rod 38, so as to communicate therewith.

A retaining cylinder 66, having a screw section 64 formed on the inner circumferential surface thereof, is coaxially and threadedly engaged with the screw section 33 of the fixed cylinder 34. More specifically, when rotated, the retaining cylinder 66 moves in the vertical direction (axial direction), because the screw section 33 of the fixed cylinder 34 and the screw section 64 of the retaining cylinder 66 are threadedly engaged with each other.

An annular main gear 60 is disposed coaxially with the retaining cylinder 66, at the upper end of the retaining cylinder 66. A bearing 62 is fitted in a circular opening 61 formed at the center of the main gear 60. An inner circumferential side of the bearing 62 is installed onto the upper end of the float rod 38. Therefore, the float rod 38 is rotatably supported through the bearing 62 at the inner circumferential portion of the main gear 60. The main gear 60 includes a plurality of teeth 63 formed along an outer circumferential surface thereof.

Figure 4:
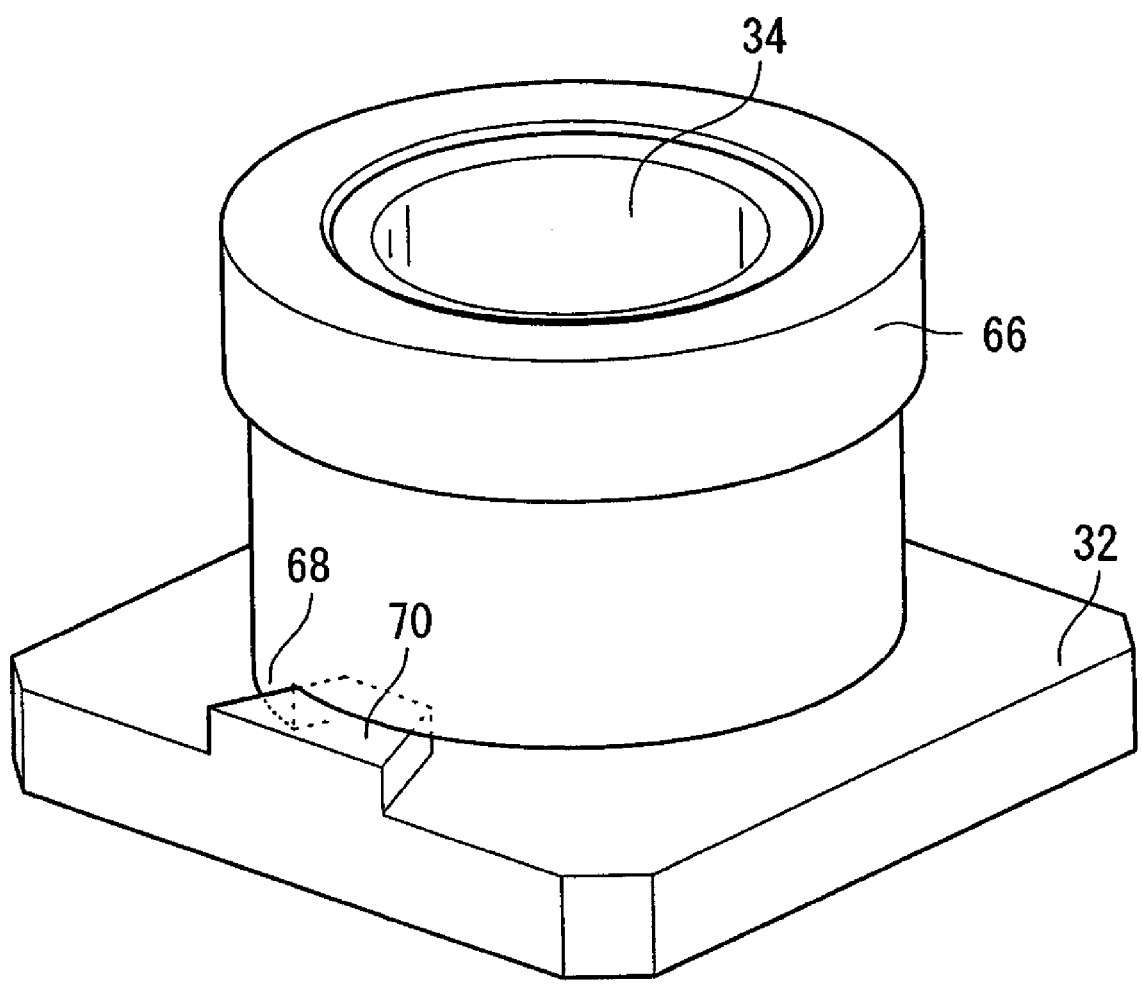
FIG. 4 is a perspective view illustrating main components and depicting a locked state, in which a retaining cylinder of the flow rate control valve shown in FIG. 2 is fastened by a lower receiving section of a base seat, by means of a lower stopper section.

On the other hand, the lower end of the retaining cylinder 66 is disposed so as to face the base seat 32. As shown in FIG. 4, a lower stopper section 68, which protrudes downwardly, is formed on the lower end. The base seat 32 includes a lower receiving section 70, which protrudes toward the retaining cylinder 66 and which can be fastened to the lower stopper section 68 in the direction of rotation.

The lower stopper section 68 is fastened by abutment against a side surface of the lower receiving section 70, at its lowermost position when the retaining cylinder 66 is rotated and displaced in the vertically downward direction (direction of the arrow X1) along the fixed cylinder 34 (see FIG. 4). Specifically, the lower stopper section 68 and the lower receiving section 70 serve to regulate rotational displacement of the retaining cylinder 66. Therefore, the retaining cylinder 66 is prevented from moving downwardly below the predetermined lowermost position.

The driving force transmission mechanism 16 includes the main gear 60, an intermediate gear 80 meshed with the main gear 60, and a driving gear 78 meshed with the intermediate gear 80.

The intermediate gear 80 has both large diameter teeth 81 and small diameter teeth 83. The intermediate gear 80 is rotatably supported with respect to the valve housing 26 by means of a rotary shaft 82 inserted into a substantially central portion thereof.

The driving gear 78 is fixed to a motor shaft 76 of the stepping motor 12, with teeth 79 formed along the outer circumferential surface thereof. The teeth 79 are meshed with large diameter teeth 81 of the intermediate gear 80. On the other hand, small diameter teeth 83 of the intermediate gear 80 are meshed with the teeth 63 of the main gear 60.

An upper stopper section 72, which protrudes upwardly, is disposed on the upper surface of the main gear 60. On the other hand, the stepping motor 12 includes an upper receiving section 84, which extends toward the main gear 60 in order to regulate the uppermost position of the retaining cylinder 66. That is, the upper stopper section 72 is fastened by abutment against the side surface of the upper receiving section 84, at the uppermost position, when the retaining cylinder 66 is rotated and displaced in the vertically upward direction (direction of the arrow X2) along the fixed cylinder 34. Accordingly, rotational displacement of the retaining cylinder 66 is regulated by the upper stopper section 72 and the upper receiving section 84. The retaining cylinder 66 thereby is prevented from being moved upwardly beyond the uppermost position.

As described above, the displacement amount of the retaining cylinder 66 in the axial direction is regulated by the lower stopper section 68, the upper stopper section 72, the lower receiving section 70, and the upper receiving section 84.

The rotary driving force of the stepping motor 12 is transmitted to the intermediate gear 80 and the main gear 60 from the driving gear 78, making up the driving force transmission mechanism 16. The retaining cylinder 66, which is connected to the main gear 60, is rotated and displaced.

The flow rate control valve 10 according to the embodiment of the present invention is basically constructed as described above. Next, its operation, function and effect shall be explained. As shown in FIG. 2, when the flow rate control valve 10 is closed, the valve plug 40 is seated on the valve seat 30 in tight contact therewith, whereby communication between the inlet port 18 and the outlet port 20 is blocked.

In order to open the flow rate control valve 10 from the valve-closed state, the stepping motor 12 is driven and rotated under action of electric power applied thereto, and the rotary driving force is transmitted from the stepping motor 12 to the driving force transmission mechanism 16. Accordingly, the driving gear 78, the intermediate gear 80, and the main gear 60 are successively rotated. The retaining cylinder 66, which is connected to the main gear 60, begins being rotated so as to cause displacement in the vertically upward direction (direction of the arrow X2) with respect to the fixed cylinder 34.

Figure 5:
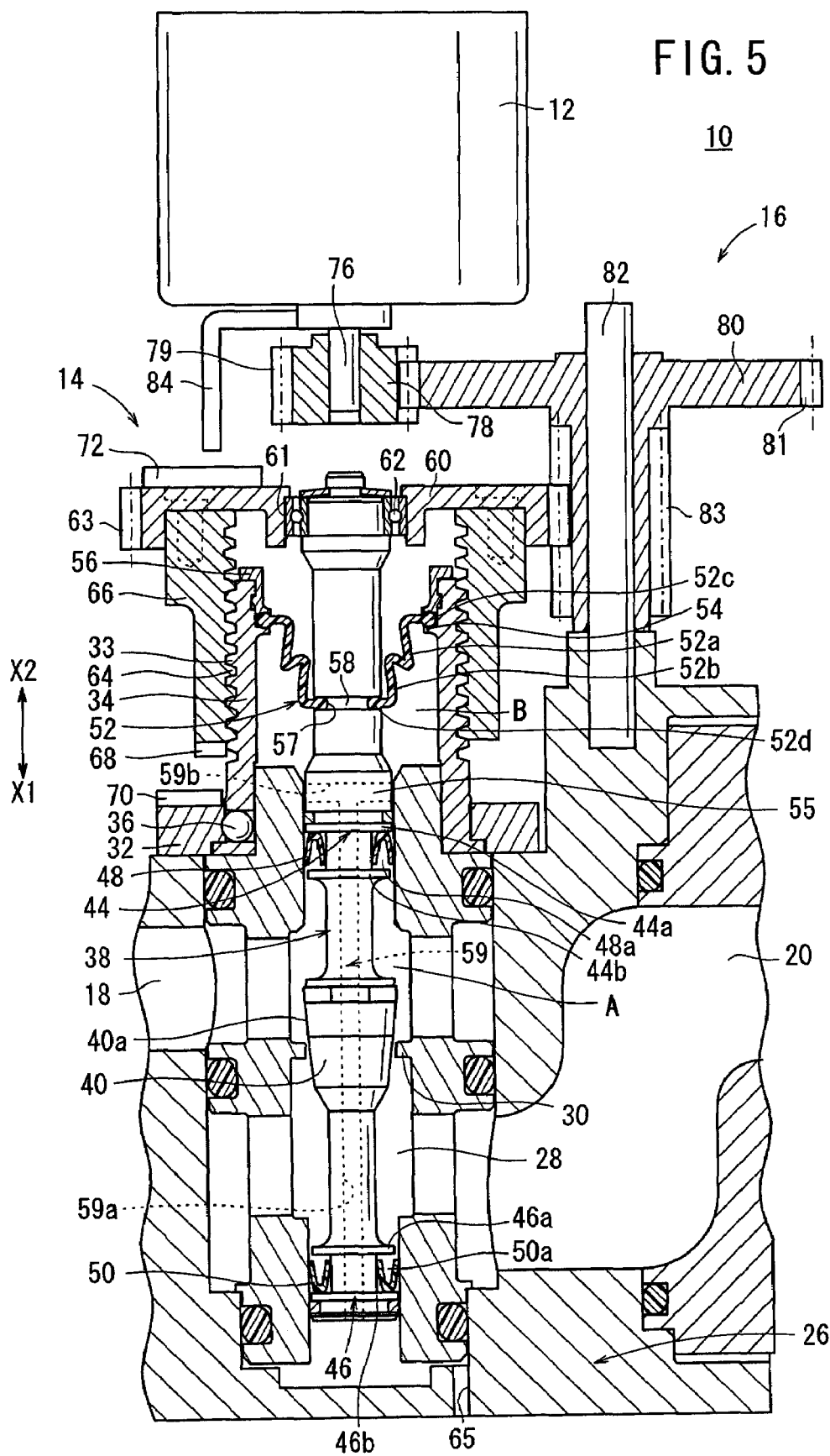
FIG. 5 is a magnified longitudinal sectional view illustrating main components and depicting a state in which the flow rate control valve shown in FIG. 2 is opened.

The float rod 38 and the valve plug 40 are moved upwardly in accordance with upward movement of the retaining cylinder 66. Accordingly, the valve plug 40 separates from the valve seat 30, and the inlet port 18 communicates with the outlet port 20 via the gap between the valve plug 40 and the valve seat 30. Fluid, for example, pure water, which is introduced from the inlet port 18, is supplied from the outlet port 20 via the valve hole 28 (see FIG. 5).

Further, when the stepping motor 12 is driven and rotated, so that the retaining cylinder 66 is rotated in the same direction, the size of the gap between the valve plug 40 and the valve seat 30 is gradually increased along the tapered surface 40a in accordance with displacement of the valve plug 40 in the vertically upward direction (direction of the arrow X2). Accordingly, a greater amount of pure water is supplied to the outlet port 20 via the gap (see FIG. 6). The flow rate of pure water is easily controlled by the valve plug 40, wherein the valve plug 40 has a simple shape provided with the tapered surface 40a.

When the retaining cylinder 66 moves further upwardly and the upper stopper section 72 abuts against the side surface of the upper receiving section 84 and is fastened thereby, then the rotational displacement of the retaining cylinder 66 is regulated. This position is the uppermost position of the retaining cylinder 66. Specifically, at this position, the retaining cylinder 66 is prevented from any unnecessary rotational displacement and rotation of the retaining cylinder 66 is stopped. Therefore, mutual breakage between the screw section 64 of the retaining cylinder 66 and the screw section 33 of the fixed cylinder 34, which otherwise could be caused by the rotational load on the retaining cylinder 66, is avoided. Further, lower stopper section 68 is fastened by the lower receiving section 70, and rotational displacement of the retaining cylinder 66 is appropriately stopped, at the lowermost position of the retaining cylinder 66, i.e., at the position where the valve plug 40 is seated on and closes the valve seat 30. Therefore, any breakage, which otherwise could be caused by rotational displacement of the screw section 64 of the retaining cylinder 66 and the screw section 33 of the fixed cylinder 34, can be avoided.

In the case of the flow rate control valve 10, as described above, high pressure pure water or the like introduced through the inlet port 18 is received by the upper seal member 48, whereby the float rod 38 is pushed upwardly in the vertical direction (direction of the arrow X2) in a state in which the valve plug 40 is seated (valve-closed state). However, when the valve plug 40 is released and unseated from the valve seat 30, and pure water flows into the valve chamber A, then, since the upper seal member 48, the lower seal member 50, and the float rod 38 have substantially the same maximum outer circumferential diameter, forces in vertically upward and downward directions (directions of the arrows X1, X2), which act on the float rod 38, are mutually offset and balanced.

Therefore, the load on the screw sections 33, 64 of the fixed cylinder 34 and the retaining cylinder 66 disappears, and frictional forces exerted on the screw sections 33, 64 are mitigated. Therefore, friction is reduced. Accordingly, the retaining cylinder 66 can be rotated at a low rotational torque.

The float rod 38 is rotatably supported by the main gear 60 through the bearing 62. Therefore, even when the retaining cylinder 66 is rotated, the float rod 38 itself moves upwardly in the axial direction (directions of the arrows X1, X2) without being rotated. Therefore, upward movement of the valve plug 40 is performed while subjected only to sliding resistance in the linear direction of the upper and lower seal members 48, 50 with respect to the valve hole 28. Therefore, rotational torque of the retaining cylinder 66 is further mitigated. Further, abrasion of the upper and lower seal members 48, 50 is reduced. Therefore, it is possible to improve durability of the upper and lower seal members 48, 50.

The screw sections 33, 64 of the fixed cylinder 34 and the retaining cylinder 66 are disposed outside of the fixed cylinder 34, whereas the fence cover 52 exists between the fixed cylinder 34 and the float rod 38. Therefore, contact is avoided between the pure water that flows into the valve chamber A and a lubricant, such as grease or the like, applied to the screw sections 33, 64 of the retaining cylinder 66 and the fixed cylinder 34. Therefore, pollution of the pure water, which would otherwise be caused by the lubricant, is avoided.

Further, the region B, formed by the installation of the fence cover 52, is shut off from the outside. Therefore, pure water or the like that invades into the region B is quickly discharged to the outside via the water vent hole 59 of the float rod 38. In particular, pure water or the like flows from the region B into the second passage 59b of the water vent hole 59, and is then introduced from the second passage 59b into the first passage, and discharged to the outside through the discharge port 65 of the valve housing 26.

The flow rate control valve of this embodiment of the present invention has been described as applied to controlling the flow of pure water. However, the invention is not limited to applications involving pure water. It goes without saying that the present invention may be applied to controlling flow of any other type of fluid.

Although certain preferred embodiments of the present invention have been shown and described in detail, it should be understood that various changes and modifications may be made therein without departing from the scope of the appended claims.

What is claimed is:

1. A flow rate control valve including a float rod inserted into a valve hole so that said float rod is capable of making reciprocating movement, said valve hole being formed in a valve housing having a fluid-introducing port and a fluid-discharging port, wherein a valve plug provided on said float rod opens and closes a valve seat, said flow rate control valve further comprising:
   a fixed cylinder into which said float rod is inserted and which has a screw section formed on an outer circumferential surface thereof;
   a retaining cylinder which has, on an inner circumferential surface thereof, a screw section threadedly engaged with said screw section of said fixed cylinder, and which is displaceable in an axial direction with respect to said fixed cylinder by rotational displacement thereof;
   a cover member installed between said fixed cylinder and said float rod, and which is capable of expanding and contracting in said axial direction;
   a first pressure-receiving section provided on one end of said float rod; and
   a second pressure-receiving section provided on another end of said float rod, and which has a pressure-receiving area equal to that of said first pressure-receiving section,
   wherein stopper mechanisms are disposed on said retaining cylinder at an uppermost position and a lowermost position thereof, for restricting the rotational displacement of said retaining cylinder which occurs when said retaining cylinder is displaced in said axial direction along said fixed cylinder.

2. The flow rate control valve according to claim 1, wherein said first and second pressure-receiving sections are composed of first and second annular seal members, which are installed on said float rod, and which have openings directed toward said valve plug.

3. The flow rate control valve according to claim 2, wherein said first and second seal members maintain air-tightness of a valve chamber formed between said fluid-introducing port and said fluid-discharging port.

4. The flow rate control valve according to claim 3, wherein said openings are formed with substantially V-shaped cross sections, respectively, which open toward said valve plug.

5. The flow rate control valve according to claim 1, wherein said cover member has one end, having a large diameter, which is installed on said fixed cylinder by a fixing member, and another end, having a small diameter, which is installed in an annular groove formed on said float rod, such that air-tightness is maintained between said fixed cylinder and said float rod.

6. The flow rate control valve according to claim 1, wherein said stopper mechanisms comprise a stopper section disposed on said retaining cylinder, and a receiving section disposed so as to oppose said stopper section and which is fastened to said stopper section.

7. The flow rate control valve according to claim 1, wherein a passage, having one end open toward a space formed by said cover member and said fixed cylinder, and another end that communicates externally of said valve housing via a discharge port in said valve housing, is formed in said float rod.

8. The flow rate control valve according to claim 3, wherein outer circumferential diameters of said first seal member, said second seal member, and said float rod are substantially equivalent to each other.

9. The flow rate control valve according to claim 1, wherein said valve plug comprises a tapered surface, which is diametrally reduced gradually toward said valve seat.

10. A flow rate control valve including a float rod inserted into a valve hole so that said float rod is capable of making reciprocating movement, said valve hole being formed in a valve housing having a fluid-introducing port and a fluid-discharging port, wherein a valve plug provided on said float rod opens and closes a valve seat, said flow rate control valve further comprising:
    a fixed cylinder into which said float rod is inserted and which has a screw section formed on an outer circumferential surface thereof;
    a retaining cylinder which has, on an inner circumferential surface thereof, a screw section threadedly engaged with said screw section of said fixed cylinder, and which is displaceable in an axial direction with respect to said fixed cylinder by rotational displacement thereof;
    a cover member installed between said fixed cylinder and said float rod, and which is capable of expanding and contracting in said axial direction, said fixed cylinder being disposed between said retaining cylinder and said cover member, wherein a length of said cover member in said axial direction is less than a length of said retaining cylinder in said axial direction;
    a first pressure-receiving section provided on one end of said float rod; and
    a second pressure-receiving section provided on another end of said float rod, and which has a pressure-receiving area equal to that of said first pressure-receiving section.

11. The flow rate control valve according to claim 10, wherein said first and second pressure-receiving sections are composed of first and second annular seal members, which are installed on said float rod, and which have openings directed toward said valve plug.

12. The flow rate control valve according to claim 11, wherein said first and second seal members maintain air-tightness of a valve chamber formed between said fluid-introducing port and said fluid-discharging port.

13. The flow rate control valve according to claim 12, wherein said openings are formed with substantially V-shaped cross sections, respectively, which open toward said valve plug.

14. The flow rate control valve according to claim 10, wherein said cover member has one end, having a large diameter, which is installed on said fixed cylinder by a fixing member, and another end, having a small diameter, which is installed in an annular groove formed on said float rod, such that air-tightness is maintained between said fixed cylinder and said float rod.

15. The flow rate control valve according to claim 10, wherein stopper mechanisms are disposed on said retaining cylinder at an uppermost position and a lowermost position thereof, for restricting the rotational displacement of said retaining cylinder which occurs when said retaining cylinder is displaced in said axial direction along said fixed cylinder.

16. The flow rate control valve according to 15, wherein said stopper mechanisms comprise a stopper section disposed on said retaining cylinder, and a receiving section disposed so as to oppose said stopper section and which is fastened to said stopper section.

17. The flow rate control valve according to claim 10, wherein a passage, having one end open toward a space formed by said cover member and said fixed cylinder, and another end that communicates externally of said valve housing via a discharge port in said valve housing, is formed in said float rod.

18. The flow rate control valve according to claim 12, wherein outer circumferential diameters of said first seal member, said second seal member, and said float rod are substantially equivalent to each other.

19. The flow rate control valve according to claim 10, wherein said valve plug comprises a tapered surface, which is diametrally reduced gradually toward said valve seat.

* * * * *